United States Patent
Matza

(10) Patent No.: US 10,184,087 B2
(45) Date of Patent: *Jan. 22, 2019

(54) OPTIMIZATION OF A METHOD FOR ISOLATION OF PARAFFINIC HYDROCARBONS

(71) Applicant: TriStar PetroServ, Inc., Houston, TX (US)

(72) Inventor: Stephen D. Matza, Houston, TX (US)

(73) Assignee: TriStar PetroServ, Inc., Houston, TX (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/987,535

(22) Filed: Jan. 4, 2016

(65) Prior Publication Data

US 2017/0190987 A1 Jul. 6, 2017

(51) Int. Cl.
- *B01D 17/04* (2006.01)
- *C10G 33/04* (2006.01)
- *C10G 21/27* (2006.01)

(52) U.S. Cl.
CPC ........... *C10G 33/04* (2013.01); *B01D 17/042* (2013.01); *B01D 17/047* (2013.01); *C10G 21/27* (2013.01); *C10G 2300/201* (2013.01)

(58) Field of Classification Search
CPC .. C10G 33/04; C10G 2300/201; C10G 21/27; B01D 17/042; B01D 17/047
USPC ................ 516/147, 200; 210/708, 767, 768; 208/188
See application file for complete search history.

(56) References Cited

U.S. PATENT DOCUMENTS

| | | | | |
|---|---|---|---|---|
| 5,897,767 A * | 4/1999 | Patel | ........................ | C10G 1/04 208/13 |
| 6,069,002 A * | 5/2000 | Powell, Jr. | ............. | B01D 17/00 134/22.18 |
| 6,197,734 B1 * | 3/2001 | Vlasblom | ................ | C11D 1/72 510/188 |
| 6,369,016 B1 * | 4/2002 | Vlasblom | ................ | C11D 1/83 510/365 |
| 6,440,330 B1 * | 8/2002 | Campbell | .............. | B01D 17/00 252/364 |
| 2009/0071510 A1 * | 3/2009 | Hancock | ................... | B08B 9/08 134/22.18 |

(Continued)

OTHER PUBLICATIONS

ASTM D1796-11e1, Standard Test Method for Water and Sediment in Fuel Oils by the Centrifuge Method (Laboratory Procedure), ASTM International, West Conshohocken, PA, 2011, pp. 1-4 (2011) (Downloaded Sep. 11, 2017) @ https://www.astm.org/DATABASE.CART/HISTORICAL/D2709-96R11E.*

(Continued)

*Primary Examiner* — Daniel S Metzmaier
(74) *Attorney, Agent, or Firm* — Tumey L.L.P.

(57) ABSTRACT

A method and system isolate paraffinic hydrocarbons. In an embodiment, a method includes providing cutter stock to a tank containing a sludge. The method also includes circulating the cutter stock and the sludge. The method further includes heating the cutter stock and the sludge. Moreover, the method includes providing water and a paraffinic hydrocarbon isolation composition to the tank. The method also includes determining if the sludge has separated into a three phase separation comprising a paraffinic hydrocarbon layer, a water layer, and a layer of settled solids.

9 Claims, 3 Drawing Sheets

(56) References Cited

U.S. PATENT DOCUMENTS

2013/0270157 A1* 10/2013 Ferrara .................. C10G 75/04
                                                      208/48 AA
2017/0190985 A1* 7/2017 Matza .................... C10G 33/04
2017/0190986 A1* 7/2017 Matza .................... C10G 33/04

OTHER PUBLICATIONS

Hawley's Condensed Chemical Dictionary, (2007), John Wiley & Sons, Inc. Online @ http://onlinelibrary.wiley.com/mrw/advanced/search?doi=10.1002/9780470114735 , downloaded Sep. 11, 2017), pp. 2, 596-597.*

* cited by examiner

OPTIMIZATION OF A METHOD FOR ISOLATION OF PARAFFINIC HYDROCARBONS

BACKGROUND OF THE INVENTION

Field of the Invention

This invention relates to the field of industrial facility cleanup and oil extraction, and, more specifically, a method to optimize the isolation of paraffinic hydrocarbons from crude oil tanks containing the paraffinic hydrocarbons.

Background of the Invention

During production, crude oil may be produced that contains dissolved waxes or paraffins. The solubility of high-molecular weight paraffin is related to temperature. When the temperature of the crude oil, or fluid in which the paraffin is dissolved, is lower than the wax precipitation temperature, the paraffin wax may precipitate and deposit under these environmental conditions. The precipitated paraffin wax may form stable wax crystals that deposit on the surfaces of equipment. When the crude oil is refined, the fractional distillation may separate one fraction of hydrocarbons from the paraffinic hydrocarbons. As a part of the process, the remaining fraction containing the paraffinic hydrocarbons may contain solids and water.

The paraffinic hydrocarbons may exist as sludge and may be stored in crude oil tanks, which are sometimes referred to as waxy crude oil tanks. The paraffinic hydrocarbons are a valuable commodity, yet the purification and separation of the paraffinic hydrocarbons from the solids and the water may be difficult, and the costs may exceed the value of the volume of the paraffinic oil.

Previous approaches to remove the paraffinic hydrocarbons have included heating the sludge deposits, dissolving them with chemical solvents, or modifying the ability of the wax to undergo crystal formation using polymeric wax crystal modifiers. Such approaches, however, do not isolate the paraffinic hydrocarbons, but merely remove them from surfaces and/or stop deposition. The valuable paraffinic hydrocarbons may be disposed of and their value lost. Further, their removal and subsequent disposal may also be an extra cost on the overall refinement process.

Consequently, there is a need for a method for the isolation and removal of paraffinic hydrocarbons.

BRIEF DESCRIPTION OF THE DRAWINGS

The Figures illustrate certain aspects of some of the examples of the present disclosure and should not be used to limit or define the method.

BRIEF SUMMARY OF SOME OF THE PREFERRED EMBODIMENTS

Figure 1:
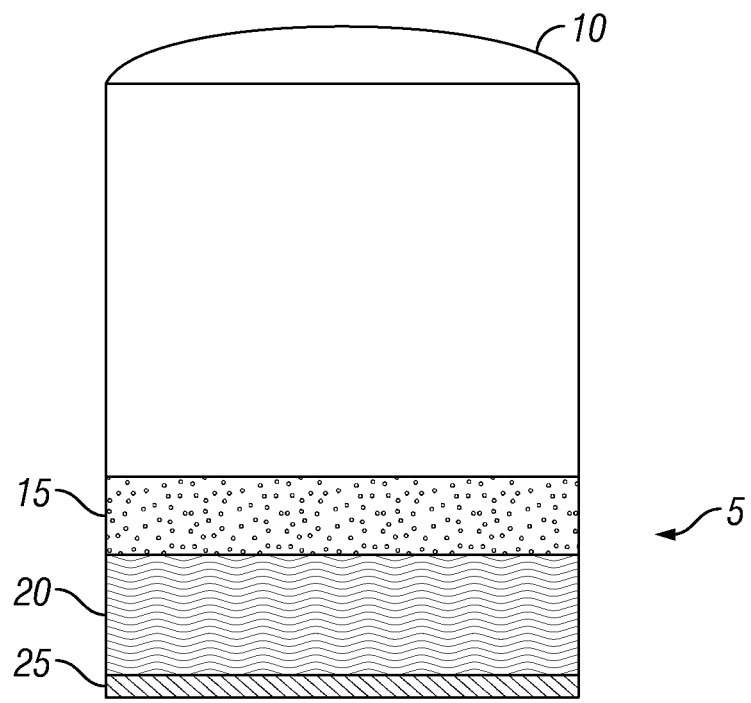
FIG. 1 illustrates a three phase separation comprising a paraffinic hydrocarbon layer, a water layer, and a layer of settled water-wet solids in accordance with certain examples.

These and other needs in the art are addressed in an embodiment by a method that includes providing cutter stock to a tank containing a sludge. The method also includes circulating the cutter stock and the sludge. In addition, the method includes heating the cutter stock and the sludge. The method further includes providing water and a paraffinic hydrocarbon isolation composition to the tank. Moreover, the method includes determining if the sludge has separated into a three phase separation comprising a paraffinic hydrocarbon layer, a water layer, and a layer of settled solids.

These and other needs in the art are addressed in other embodiments by a system that includes a paraffinic hydrocarbon isolation composition. The system also includes a first tank configured to provide the paraffinic hydrocarbon isolation composition to a second tank. In addition, the system includes at least four nozzles configured to circulate and a heat source.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

DETAILED DESCRIPTION

In embodiments, the method for isolation of paraffinic hydrocarbons comprises a paraffinic hydrocarbon isolation composition. Embodiments of the paraffinic hydrocarbon isolation composition comprise a mixture of a combination demulsifier and crystal modifier, surfactants, and a solvent. The combination demulsifier and crystal modifier is isopropylamine dodecylbenzene sulfonate ("IDBS"). The surfactants may be nonionic, anionic, cationic, or zwitterionic. The solvent may be any compatible light hydrocarbon. The paraffinic hydrocarbon isolation composition may be used to isolate paraffin hydrocarbons from water and solids. A "paraffin hydrocarbon" as defined herein, is a hydrocarbon having a carbon number of 18 to 36. Without limitation, the paraffinic hydrocarbon isolation composition may modify the paraffin wax crystals found in crude oil tanks, or other such equipment, such that the paraffin hydrocarbons remain fluid and do not precipitate when cooled, moreover the paraffinic hydrocarbon isolation composition may break the water-in-oil emulsion, separating the water from the paraffinic hydrocarbons and also removing any paraffinic hydrocarbons from the surface of the solids. The resulting product is a three phase separation of the paraffinic hydrocarbons, water, and the settled water-wet solids. In embodiments, the paraffinic hydrocarbon isolation composition may be used to isolate the paraffin hydrocarbons from any industrial equipment used in industrial facilities including vessels, tanks, vacuum towers, heat exchangers, piping, distillation columns, and the like. In embodiments, the paraffinic hydrocarbon isolation composition may be used to remove the paraffin hydrocarbons from any equipment used to produce, store, or transport the paraffin hydrocarbons during the processes of crude oil refinement, natural gas processing, hydrocarbon transport, hydrocarbon processing, hydrocarbon cleanup, and the like.

Embodiments of the paraffinic hydrocarbon isolation composition comprise the combination wax crystal modifier and demulsifier, IDBS. The paraffinic hydrocarbon isolation composition may have any wt. % of IDBS suitable for isolating the paraffin hydrocarbons from any water or solids present, such that as pure as possible a volume of the paraffin hydrocarbons is produced. For instance, the paraffin hydrocarbons may be removed from the surface of industrial equipment and subsequently purified by the production of a three phase separation comprising the paraffin hydrocarbons, water, and any settled water-wet solids. In an embodiment, the paraffinic hydrocarbon isolation composition has between about 0.5 wt. % IDBS and about 65.0 wt. % IDBS, alternatively between about 25.0 wt. % IDBS and about 65.0 wt. % IDBS. In some embodiments, the IDBS may comprise about 63.0 wt. % to about 65.0 wt. % of the paraffinic hydrocarbon isolation composition. With the benefit of this disclosure, one having ordinary skill in the art will be able to select an appropriate amount of IDBS to include in the paraffinic hydrocarbon isolation composition for a chosen application.

Embodiments of the paraffinic hydrocarbon isolation composition comprise one or more surfactants. The surfactants may be cationic, anionic, nonionic, zwitterionic, or any combination thereof. Examples of cationic surfactants may include, but are not limited to, quaternary ammonium salts such as an imidazole derivative, heterocycles (e.g., isostearyl ethylimidazolinium ethosulfate ("ISES"), etc.), alkyl-substituted pyridines, morpholinium salts, alkyl ammonium salts (e.g., cetyl trimethylammonium bromide, stearalkonium chloride, dimethyldioctadecylammonim chloride, etc.), the like, or any combination thereof. Examples of anionic surfactants may include, but are not limited to, carboxylates (e.g., trideceth-8 carboxylate, lauryl ether carboxylate, myristyl ether carboxylate), sulfonates (e.g., alkylbenzene sulfonate), sulfates (e.g., alkyl sulfates, alkyl ether sulfates), the like, or any combination thereof. Examples of nonionic surfactants include, but are not limited to, glycol derivatives (e.g., polyethylene glycol, methoxypolyethylene glycols), ethoxylates (e.g., alcohol ethoxylates, ethoxysulfates), the like, or any combination thereof. Examples of zwitterionic surfactants include, but are not limited to, betaines (e.g., cocoamidopropyl betaine), hydroxysultaines (e.g., cocoamidopropyl hydroxysultaine), amphoacetates (e.g., sodium lauroamphoacetate), the like, or any combination thereof. The surfactants may be mixed such that the paraffinic hydrocarbon isolation composition comprises multiple classes of surfactants, for example, in an embodiment, the paraffinic hydrocarbon isolation composition may comprise an anionic surfactant, a nonionic surfactant, and a zwitterionic surfactant. In a specific embodiment, the paraffinic hydrocarbon isolation composition comprises the surfactants polyethylene glycol and cocoamidopropyl betaine. The total amount of surfactants may vary as desired in order to achieve the desired result. In embodiments, the total amount of surfactants in the paraffinic hydrocarbon isolation composition may include or be any value between about 0.01 wt. % to about 5 wt. %, alternatively, about 0.05 wt. % to about 3 wt. %, or further alternatively, about 0.1 wt. % to about 1 wt. %. In an embodiment, the paraffinic hydrocarbon isolation composition comprises polyethylene glycol in an amount of about 1 wt. % or less and cocoamidopropyl betaine in an amount of about 0.1 wt. % or less. When choosing surfactants, it is desirable to choose surfactants that do not interfere with the functionality of the IDBS and/or to use an amount of surfactant that does not interfere with the functionality of the IDBS. With the benefit of this disclosure, one having ordinary skill in the art will be able to select an appropriate type(s) and amount of surfactants to include in the paraffinic hydrocarbon isolation composition for a chosen application.

Embodiments of the paraffinic hydrocarbon isolation composition comprise a solvent. The solvent may be any solvent, or combination of solvents, suitable for dissolving and carrying the surfactant and IDBS. Further, it may be desirable to use a solvent that is compatible with the paraffinic hydrocarbons and any cutter stock used to dilute the "sludge," which is the mixture of the paraffinic hydrocarbons, water, and solids present in a vessel, for example, vessel 10 as illustrated on FIG. 1. Examples of solvents generally include light hydrocarbons, aliphatic hydrocarbons, or aromatic hydrocarbons. Without limitation, the solvent may include, but should not be limited to, diesel, biodiesel, cycle oil, crude oil, light sweet crude oil, the like, or a combination thereof. In embodiments, the paraffinic hydrocarbon isolation composition may include the solvent in an amount between about 30.0 wt. % solvent to about 98.0 wt. % solvent, alternatively, between about 30.0 wt. % solvent and about 50.0 wt. % solvent, or further alternatively, between about 32.0 wt. % solvent and about 35.0 wt. % solvent. With the benefit of this disclosure, one having ordinary skill in the art will be able to select an appropriate type and amount of the solvent to include in the paraffinic hydrocarbon isolation composition for a chosen application.

The paraffinic hydrocarbon isolation composition may be prepared by any suitable method. The components may be mixed in any order as desired. For example, the IDBS may be added to a surfactant and mixed, and then the solvent may be added subsequently and mixed with the IDBS and surfactant to form the paraffinic hydrocarbon isolation composition. Alternatively, the IDBS may be added to the solvent and mixed, and then one or more surfactants may be added to the IDBS and solvent and mixed. The paraffinic hydrocarbon isolation composition may be prepared at any suitable temperature or pressure, including ambient temperature and pressure. Thus, there is no preferred way to produce the paraffinic hydrocarbon isolation composition, and the proper production of the paraffinic hydrocarbon isolation composition, with the benefit of this disclosure, will be within the understanding of one of ordinary skill in the art.

In embodiments, a process for isolating the paraffinic hydrocarbons comprises contacting the sludge with the paraffinic hydrocarbon isolation composition. As used herein, "sludge" describes the mixture of the paraffinic hydrocarbons, water, and solids. The term "sludge" does not imply any particular viscosity, clarity, consistency, etc. Further, the term "sludge," does not exclude the presence of other components present in the sludge besides the paraffinic hydrocarbons, water, and solids. For example, the sludge may comprise hydrocarbons in addition to the paraffinic hydrocarbons. In embodiments, the paraffinic hydrocarbon isolation composition may be introduced into a vessel in which a sludge is disposed. The paraffinic hydrocarbon isolation composition may be introduced into the vessel by any suitable means such that the paraffinic hydrocarbon isolation composition contacts the sludge disposed therein. In embodiments, the paraffinic hydrocarbon isolation composition is poured, pumped, injected, the like, or any combination thereof in the vessel. As an example, in some embodiments, the paraffinic hydrocarbon isolation composition is injected into a vessel via a pressurized injection. For example, the paraffinic hydrocarbon isolation composition may be injected into the vessel with a pressure at a flow rate of about 1,000 gpm to about 3,500 gpm, alternatively, at about 2,650 gpm to about 3,350 gpm, or further alternatively, at about 2,800 gpm to about 3,200 gpm. With the benefit of this disclosure, one having ordinary skill in the art will be able to select an appropriate injection method for the paraffinic hydrocarbon isolation composition for a chosen application.

As discussed above, embodiments of the paraffinic hydrocarbon isolation composition may be used to produce a three phase separation of paraffinic hydrocarbons, water, and settled water-wet solids. FIG. 1 illustrates an example of a three phase separation 5. The three phase separation 5 is disposed within a vessel 10, for example, a crude oil tank. In the three phase separation 5, the paraffinic hydrocarbon layer 15 is disposed above the water layer 20. Any settled water-wet solids 25 may be disposed beneath the water layer 20. In embodiments, the three phase separation 5 is produced by contacting a sludge mixture comprising the paraffinic hydrocarbons, water, and solids. Heat may be added to help liquefy the sludge so that the paraffinic hydrocarbon isolation composition may be circulated throughout the sludge. Without limitation by theory, the IDBS as a dual function wax crystal modifier and demulsifier, modifies paraffin wax crystal formation so that when the IDBS has been thoroughly circulated amongst the sludge, the paraffin hydrocarbons may not recrystallize even when cooled to below the wax precipitation temperature.

Once a three phase separation 5 has been produced, the paraffinic oil layer 15 may be removed. In some embodiments, it may be desired to drain the water layer 20 or to add water to the water layer 20 such that the paraffinic hydrocarbon layer 15 is positioned such that a means for removal, for example, a drain, suction valve, etc. may be positioned adjacent to the paraffinic hydrocarbon layer 15. When draining the water layer 20 or adding to the water layer 20, it may be desirable to not disturb the interface between the water layer 20 and the paraffinic hydrocarbon layer 15 as this may result in unwanted mixing between the separated layers.

In embodiments, heat may be applied to the paraffinic hydrocarbon isolation composition and/or the sludge containing the paraffinic hydrocarbons. In embodiments, and without limitation by theory, the heat may be used to liquefy (i.e., reduce the viscosity) of the sludge so that the paraffinic hydrocarbon isolation composition may be more easily circulated amongst it. The heat may be applied by steam, boiler and heat exchanger, heated coils, or the like. In embodiments, using steam, the steam may be at any sufficient temperature. In embodiments, and without limitation, sufficient heat is applied to raise the temperature to the melting point of the paraffinic hydrocarbons in the sludge. In an embodiment, the amount of heat applied is between about 35° C. to about 80° C. In some alternative embodiments, the amount of heat applied is between about 40° C. to about 70° C. In further alternative embodiments, the amount of heat applied is between about 40° C. to about 60° C. The heat may also be applied to the paraffinic hydrocarbon isolation composition prior to the paraffinic hydrocarbon isolation composition contacting the sludge or concurrently while the paraffinic hydrocarbon isolation composition is contacting the sludge. In embodiments using steam, the steam may be applied at any sufficient pressure, for example, the steam may be applied at a pressure between about 50 psig to about 250 psig, alternatively, 100 psig to about 200 psig, or further alternatively, about 100 psig to about 150 psig. With the benefit of this disclosure, one having ordinary skill in the art will be able to heat the paraffinic hydrocarbons to a desired temperature for a chosen application.

As discussed above, proper circulation may be important in treating the sludge (i.e., to produce a three phase separation 5) as it may be desirable to mix the paraffinic hydrocarbon isolation composition thoroughly with the sludge so as to modify the wax crystal formation potential of as much of the paraffinic hydrocarbons as can be achieved and also to break any water-in-oil or oil-in-water emulsions which may form so as to produce as clean a three phase separation 5 as possible. The circulated paraffinic hydrocarbon isolation composition may be circulated in the tank using any sufficient method to distribute the paraffinic hydrocarbon isolation composition throughout and amongst the sludge as evenly as possible. Once a proper temperature is achieved, the vessel 10 contents (including the sludge and the paraffinic hydrocarbon isolation composition) may be circulated in an amount between about ten vessel volumes to about thirty vessel volumes. For example, the vessel 10 contents may be circulated in an amount between about ten vessel volumes to about twenty vessel volumes, or alternatively, about ten vessel volumes to about fifteen vessel volumes. Once the desired amount vessel volumes have been recirculated; recirculation, heat, and any agitation may be halted so as to allow the phases to separate into the three phase separation 5. With the benefit of this disclosure, one having ordinary skill in the art will be able to circulate the volume of vessel 10 a sufficient amount for a chosen application.

In embodiments, the paraffinic hydrocarbon isolation process may include the use of a cutter. The cutter may be used to reduce the viscosity of the sludge through dilution. The cutter may be any light sweet oil with an API gravity of 30 or greater. Without limitation, for example, the cutter may be light cycle oil, diesel, light sweet crude oil, the like, or any combination thereof. In some embodiments, the cutter may be the same as the solvent used in the paraffinic hydrocarbon isolation composition. The cutter may be added to the sludge in any ratio. For example, the cutter may be added to the sludge in a sludge:cutter:water ratio of about 4:2:1, where the water represents the total water in the tank including water emulsified with the sludge and any added water which may not be emulsified with sludge. Alternatively, the cutter may be added in a sludge:cutter:water ratio of about 4:4:1 or alternatively a sludge:cutter:water ratio of about 2:2:1. With the benefit of this disclosure, one having ordinary skill in the art will be able to add an appropriate amount of cutter to reduce the viscosity of the sludge a sufficient amount.

Figure 2:
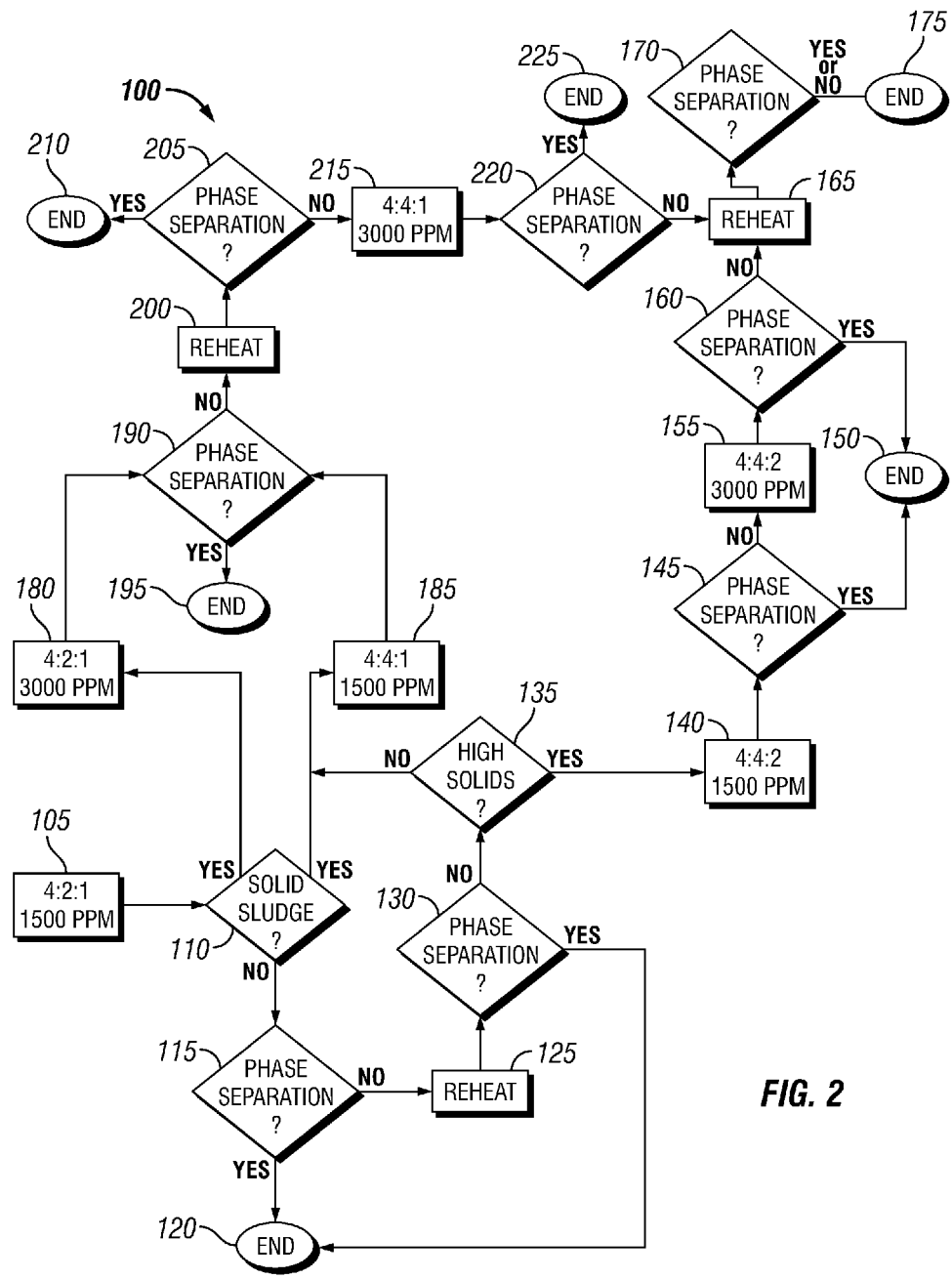
FIG. 2 illustrates a flowchart for optimization of the process for isolating paraffinic hydrocarbons from water and solids in accordance with certain examples.

In embodiments, the economical and practical use of a method for isolation of paraffinic hydrocarbons may comprise the optimization of the sludge:cutter:water ratio and the optimization of the concentration of the IDBS. FIG. 2 illustrates a flowchart for the optimization of the use of the paraffinic hydrocarbon isolation composition. It is to be understood that the optimization process depicted by FIG. 2 is to be performed on experimental samples obtained from the vessel 10 in which treatment is desired. The samples may be obtained directly from the vessel 10 if desired. In embodiments, care may be taken to obtain representative samples that reflect, as close as possible, the entire contents of the vessel 10. It may be desirable, to obtain samples from multiple access points and multiple depths. Further, it may be desirable to circulate the contents of vessel 10 prior to obtaining a sample. Typically, multiple samples may be obtained in the event that the standard protocol requires modification in order to achieve optimization, as well as to repeat the sample testing process to obtain an average of results.

As shown in FIG. 2, the optimization process 100 may be initiated with the testing of a collected sample at the step indicated by block 105. The sample testing step at block 105 utilizes a sludge:cutter:water ratio of about 4:2:1 and the concentration of the IDBS is approximately 1500 ppm, alternatively from about 1,000 ppm to about 2,000 ppm. As described above, the IDBS may be mixed with a solvent and one or more surfactants (i.e., the paraffinic hydrocarbon isolation composition). The solvent may be the same or different from the cutter stock. The paraffinic hydrocarbon isolation composition and the sample are mixed thoroughly, for example, by using a magnetic stir bar set at a rate sufficient to create a vortex within the sample container. The sample may be heated, for example, to a temperature greater than the melting point of the paraffinic hydrocarbons (e.g., a temperature between about 40° C. to about 80° C.). The sample may be stirred and heated for approximately an hour, alternatively from about 30 minutes to about 2 hours. The sample may then be removed from the heat source and agitation/stirring stopped. The sample may be allowed to sit until a water layer (e.g., water layer 20 as described in FIG. 1) has appeared. Once a water layer has appeared a "Basic Sediment and Water Test," as described below, may be used to measure the purity of the three phase separation (e.g., three phase separation 5, as illustrated in FIG. 1).

In embodiments, the purity of a three phase separation may be measured by lab testing. For example, a "Basic Sediment and Water Test" ("BS&W") as described by ASTM D1796-11e1 may be used to measure the purity of the paraffinic hydrocarbon layer. For example, a volume of organic solvent, for example toluene, may be placed in a centrifuge tube. A volume of the paraffinic hydrocarbon layer equal in volume to the volume of the organic solvent may subsequently be added to the centrifuge tube. After mixing the contents, the centrifuge tube may then be placed in a centrifuge and counterbalanced. The centrifuge tube may then be centrifuged for a sufficient amount of time to allow for phase separation. For example, the centrifuge tube may be centrifuged for about 15 minutes at a centrifugal speed of 1,250 rpm or greater. After centrifugation, the centrifuge tube may be removed and the volume of each individual layer (e.g., the paraffinic hydrocarbon layer 15, the water layer 20, and the layer of settled water-wet solids 25 as illustrated in FIG. 1) may be determined. The BS&W percentage in the removed sample obtained from the paraffinic hydrocarbon layer may then be determined according to the following equation:

$$BS\&W\ (\%) = [(\text{mL water} + \text{mL settled solids})/\text{mL total sample}] \times 100 \quad (\text{eq. 1})$$

In embodiments, the paraffinic hydrocarbon layer may be 95% pure or greater, which refers to the paraffinic hydrocarbon layer having a BS&W percentage of 5% or less. In alternative embodiments, the paraffinic hydrocarbon layer 15 may be 98% pure or greater (i.e. BS&W percentage of 2% or less). In further alternative embodiments, the paraffinic hydrocarbon layer 15 may be 99% pure of greater (i.e. BS&W percentage of 1% or less). The BS&W test may be used in the optimization process 100 to determine the optimal sludge:cutter:water ratio and concentration of the IDBS to produce a three phase separation with a desired purity. The BS&W test may also be used to measure the purity of the full-scale completed process in a vessel (e.g., vessel 10 as illustrated in FIG. 1) in order to determine if the purity of the isolated paraffinic hydrocarbon layer is sufficient for the desirable downstream application.

With continued reference to FIG. 2, if the sludge remains solid or if there is no three phase separation, additional modifications to the chemistry and/or the concentration of the paraffinic hydrocarbon isolation composition may be made. Diamond 110 is an evaluation of the status of the sludge. Specifically, diamond 110 is a visual and/or tactile check to determine if the sludge is solid after the one hour reaction period (alternatively from about 30 minutes to about 2 hours) discussed above at the sample testing step indicated by block 105. If the sludge is not solid, the optimization process 100 proceeds to a determination of phase separation indicated by diamond 115. If the sludge is solid, parallel testing samples are tested under two different conditions as will be discussed below.

Diamond 115 is a visual determination of a three phase separation (e.g., three phase separation 5 in FIG. 1). At the process step indicated by diamond 115, the sample is inspected for the presence of a water layer, a paraffinic hydrocarbon layer, and also the potential presence of a settled water-wet solids layer. If a three phase separation is present, the BS&W test, as described above, may be performed to determine if the three phase separation has achieved the desired level of purity. If the desired level of purity is achieved, the testing is complete, and the sludge:cutter:water ratio of 4:2:1 and IDBS concentration of approximately 1500 ppm (alternatively from about 1,000 ppm to about 2,000 ppm) may be used for full scale isolation of the paraffinic hydrocarbons in vessel 10. This is represented by oval 120 signifying the end of sample testing.

Continuing from diamond 115, if a three phase separation is not achieved, it may be desirable to reheat the reaction as indicated by a reheating step noted by box 125. The test sample may be reheated for another reaction period of approximately an hour, alternatively from about 30 minutes to about 2 hours. After the reheating time, another phase separation determination is performed as indicated by diamond 130. The phase separation determination at diamond 130 is identical to the phase separation determination at diamond 115. If phase separation is achieved, a BS&W test may be performed as described above. If a phase separation is not achieved, the amount of solids is measured as indicated by a solids measurement test at diamond 135. A high solids level may be determined by the BS&W test that is performed at the beginning of the process on the as-received sludge sample. If a large amount of solids are present, the volumes of cutter stock and water are doubled and the ratio of the sludge:cutter:water is adjusted to 4:4:2 while maintaining the concentration of IDBS at 1500 ppm, alternatively from about 1,000 ppm to about 2,000 ppm. As described above, the IDBS may be mixed with a solvent and one or more surfactants. The solvent may be the same or different from the cutter stock. Testing with a new sample is initiated at these parameters, as indicated by the sample testing step at box 140. The testing process is identical to that described above in regards to box 105. After testing, another phase separation determination is performed as noted by diamond 145. If phase separation is achieved, a BS&W test may be performed on the recovered hydrocarbon as described above. If the desired purity is achieved, testing is complete and the sludge:cutter:water ratio of 4:4:2 and IDBS concentration of approximately 1500 ppm (alternatively from about 1,000 ppm to about 2.000 ppm) may be used for full scale isolation of the paraffinic hydrocarbons in vessel 10. This is represented by oval 150 signifying the end of sample testing. If there is no phase separation or the desired level of purity is not reached, the level of IDBS may be doubled as indicated by the sample testing step at box 155, which uses a sludge:cutter:water ratio of about 4:4:2 and an IDBS concentration of approximately 3000 ppm, alternatively from about 3,000 ppm to about 5.000 ppm. As described above, the IDBS may be mixed with a solvent and one or more surfactants. The solvent may be the same or different from the cutter stock. Testing with a new sample is initiated at these parameters. The reaction conditions are identical to those of the sample testing steps as boxes 105 and 140. After the reaction has completed, another phase separation determination, illustrated by diamond 160, is performed. If phase separation is achieved, a BS&W test may be performed on the recovered hydrocarbon as described above, and if the desired purity is achieved, the sample testing is concluded and a sludge:cutter:water ratio of about 4:4:2 and IDBS concentration of approximately 3000 ppm, alternatively from about 3,000 ppm to about 5,000 ppm, may be used for full scale isolation of the paraffinic hydrocarbons in vessel 10. This is represented by oval 150 signifying the end of sample testing. If phase separation is not achieved, it may be desirable to reheat the sample as indicated by box 165, which denotes a reheating operation. The sample may be reheated for another reaction period of approximately an hour, alternatively from about 30 minutes to about 2 hours. After the reaction time, another phase separation determination is performed, illustrated by diamond 170. This phase separation determination is identical in practice to the phase separation determinations of earlier steps. If phase separation is achieved a BS&W test may be performed on the recovered hydrocarbon as described above, and if the desired purity is achieved, the testing is complete and a sludge:cutter:water ratio of about 4:4:2 and IDBS concentration of approximately 3000 ppm, alternatively from about 3,000 ppm to about 5,000 ppm, may be used for full scale isolation of the paraffinic hydrocarbons in vessel 10. This is represented by oval 175 signifying the end of sample testing. If a phase separation is not achieved, the use of the paraffinic hydrocarbon isolation composition is not appropriate for isolation of the paraffinic hydrocarbons within vessel 10, and treatment may not be performed. The optimization process is therefore concluded, and no optimization is possible. This is represented by oval 175 signifying the end of sample testing.

With reference to the process step represented by diamond 110, and as discussed above, should the sludge remain solid after testing at a sludge:cutter:water ratio of about 4:2:1 and an IDBS concentration of approximately 1500 ppm, alternatively from about 1,000 ppm to about 2,000 ppm; parallel sample testing is to be conducted. One sample is to be tested at double the amount of IDBS while maintaining a sludge:cutter:water ratio of about 4:2:1. This sample testing is noted by box 180. The other sample is to be tested at double the amount of cutter while maintaining the IDBS at 1500 ppm (alternatively from about 1,000 ppm to about 2.000 ppm), and this sample testing is noted by box 185. As described above, the IDBS may be mixed with a solvent and one or more surfactants. The solvent may be the same or different from the cutter stock. Further, the sample testing step at box 185 is also the process step if the level of solids, as measured during the solids measurement step indicated by diamond 135, is determined to be normal. After the reactions have completed, another phase separation determination at diamond 190 is performed for each sample. The phase separation determination at step 190 is identical to the phase separation determinations at the steps indicated by diamonds 115, 130, 145, etc. If phase separation is achieved for either sample, a BS&W test may be performed on the recovered hydrocarbon as described above. If the desired purity is achieved, the testing is complete, and the respective sludge:cutter:water ratio and IDBS concentration (i.e. either 4:2:1 and 3000 ppm, alternatively from about 3,000 ppm to about 5,000 ppm, or 4:4:1 and 1500 ppm, alternatively from about 1,000 ppm to about 2,000 ppm) may be used for full scale isolation of the paraffinic hydrocarbons in vessel 10. This is represented by oval 195 signifying the end of sample testing. If phase separation is not achieved, it may be desirable to reheat both of the samples as indicated by box 200 for another reaction period of approximately an hour, alternatively from about 30 minutes to about 2 hours. After the reaction time, another phase separation determination is performed as indicated by diamond 205. If phase separation is achieved, a BS&W test may be performed on the recovered hydrocarbon as described above. If the desired purity is achieved, the respective sludge:cutter:water ratio and IDBS concentration (i.e. either 4:2:1 and 3000 ppm, alternatively from about 3,000 ppm to about 5,000 ppm, or 4:4:1 and 1500 ppm, alternatively from about 1,000 ppm to about 2,000 ppm) may be used for full scale isolation of the paraffinic hydrocarbons in vessel 10. This is represented by oval 210 signifying the end of sample testing. If there is no phase separation or the desired level of purity is not reached, a new sample is prepared and tested as indicated by the sample testing process noted by box 215, which uses a sludge:cutter:water ratio of about 4:4:1 and an IDBS concentration of approximately 3000 ppm, alternatively from about 3,000 ppm to about 5,000 ppm. As described above, the IDBS may be mixed with a solvent and one or more surfactants. The solvent may be the same or different from the cutter stock. After the reaction time, another phase separation determination is performed as indicated by diamond 220. If phase separation is achieved, a BS&W test may be performed on the recovered hydrocarbon as described above, and if the desired purity is achieved, the respective sludge:cutter:water ratio of 4:4:1 and IDBS concentration of 1500 ppm, alternatively from about 1,000 ppm to about 2.000 ppm, may be used for full scale isolation of the paraffinic hydrocarbons in vessel 10. This is represented by oval 225 signifying the end of sample testing. If phase separation is not achieved, it may be desirable to reheat the reaction as indicated by box 165 for another reaction period of approximately an hour, alternatively from about 30 minutes to about 2 hours. After the reaction time, another phase separation determination is performed as indicated by diamond 170. If phase separation is achieved, a BS&W test may be performed on the recovered hydrocarbon as described above, and if the desired purity is achieved, the testing is complete and a sludge:cutter:water ratio of about 4:4:1 and IDBS concentration of approximately 3000 ppm, alternatively from about 3,000 ppm to about 5,000 ppm, may be used for full scale isolation of the paraffinic hydrocarbons in vessel 10. This is represented by oval 175 signifying the end of sample testing. If a phase separation is not achieved, the use of the paraffinic hydrocarbon isolation composition is not appropriate for isolation of the paraffinic hydrocarbons within vessel 10, and treatment may not be performed. The optimization process is therefore concluded. This is represented by oval 175 signifying the end of sample testing.

The production of the three phase separation 5 may take any suitable period of time to complete. In embodiments, the three phase separation 5 may take as long a period of time as it takes to recirculate the desired amount of volumes of the vessel, for example, vessel 10. For example, if a three phase separation 5 uses a ten vessel volume recirculation for the desired separation, the time period to produce the three phase separation 5 is the time suitable to complete the ten volume vessel recirculation. As a result, the period of time sufficient to produce the three phase separation 5 may be dependent upon the size and shape of the vessel, the volume of sludge within the vessel, the recirculation equipment used to recirculate the vessel volume, etc. Further, in addition to the time to recirculate the vessel volume, additional time may be suitable to allow any of the solids, which may be present within the sludge, to settle. In particular, sufficient time may be provided for the solids to settle out of the paraffinic hydrocarbon layer 15. With the benefit of this disclosure, one having ordinary skill in the art will be able to recognize the appropriate amount of time to apportion for a chosen application.

In optional embodiments, once the paraffinic hydrocarbons have been removed, the water in the water layer 20 may be removed and disposed of, for example, at a water treatment facility. The settled water-wet solids 25 may also be removed of and disposed at any facility sufficient for the removal of this class of solids. With the benefit of this disclosure, one having ordinary skill in the art will be able to remove the remaining water and solids from a vessel, for example, vessel 10 in FIG. 1 and dispose of the remaining water and solids as appropriate.

In optional embodiments, the paraffinic hydrocarbon isolation composition may be used in conjunction with other products used to treat industrial equipment. In embodiments, the paraffinic hydrocarbon isolation composition may be used concurrently with materials, which may remove hazardous reactive sulfides, for example, $H_2S$. For example, the paraffinic hydrocarbon isolation composition may be used in conjunction with mild oxidizers such as methylmorpholine-N-oxide, which may remove hazardous reactive sulfides, for example, $H_2S$ and may convert pyrophoric iron sulfides to non-pyrophoric forms. This is but one embodiment, and the paraffinic hydrocarbon isolation composition may be used with any such additional treatment compositions, however, care may be taken to use the paraffinic hydrocarbon isolation composition only with compatible additional treatment compositions that may not negatively interfere with the functionality of the paraffinic hydrocarbon isolation composition.

Embodiments disclosed herein relate to a system and method for cleaning paraffinic crude oil tanks. Regular paraffinic or waxy crudes are widespread in the world and create major complex systems problems related to the production, processing, and transportation of these light gravity fluids. The systems and methods disclosed herein may be specially designed to serve the cleaning needs of refinery and terminal operators who experience paraffinic hydrocarbon containing tanks, or more commonly referred to as waxy crude oil tanks that contain oil, water, and other solids. The systems and methods may operate to separate into three levels: oil, water, and water wet solids.

The systems and methods may be designed to work with paraffinic oil to remove the in situ solids and water from the oil providing a three phase separation of oil, water, and water-wet solids leaving the paraffin fluidized in the oil phase. Ranges for a percent of solids by volume may include about 2% to about 20%. This range may allow for a sufficient amount of solids that the removal of those solids from suspension improves the quality of the remaining oil, without containing such a high level of solids as to render this process inefficient in its operation.

There may be a specific threshold of a water level where a chemical surfactant may properly react with the oil and solid particulates in order to separate the oil from the solids and water. The threshold water level may ensure sufficient water is present in the sludge to allow a chemical separation to occur. Also, sufficient water levels, post separation may allow for settling of the solids below the oil layer. Generally, this threshold water level may be around 20% water by volume.

Cleaning paraffinic crude oil tanks may include 4 phases: (1) Circulation, (2) Chemistry Introduction, (3) Settling, and (4) Pump-off.

The Circulation Phase may include two primary objectives: (1) achieve circulation of the entire contents of the tank, and (2) reach the pre-determined temperature for an effective introduction of a paraffinic hydrocarbon isolation composition. In the circulation phase, cutter stock may be introduced to the tank. Cutter stock may be any petroleum stock which is used to reduce the viscosity of a heavier residual stock by dilution. During this phase, chemical contact and tank homogenization may occur in order to achieve a proper reaction between the tank contents and a paraffinic hydrocarbon isolation composition. The time required for this circulation may vary and may depend on many factors, including the characteristics of sludge, efficiency at reaching a specific temperature, and the volume of the in situ solids.

The Chemistry Introduction Phase may include introducing the paraffinic hydrocarbon isolation composition after circulation is established. The introduction of paraffinic hydrocarbon isolation composition after circulation is established may allow for an effective blend of all the tank contents, and may ultimately provide for three phase separation.

The Settling Phase may include a settling period which may allow the paraffinic hydrocarbon isolation composition to operate effectively, and to allow a necessary time for full and complete three phase separation resulting in distinguishable layers of oil, water, and water wet solids. Shortening the settling phase may result in failure to obtain the separation. A substantial amount of time may be necessary to allow the tank materials to stop circulating: the interior movements may continue long after the pumps are turned off.

The Pump-off Phase involves removal of material by layer. Generally, the first layer pulled may be the uppermost oil layer, followed by the water layer, leaving the remaining water wet solids layer for further removal or processing. It may be necessary to draw down the water layer first, until clarified oil is reached, before removing the top oil layer. Occasionally, it may be necessary to add water after the settling phase to raise the level of oil to the appropriate draw point. Once pump-off is complete, the tank cleaning may be complete.

Figure 3A:
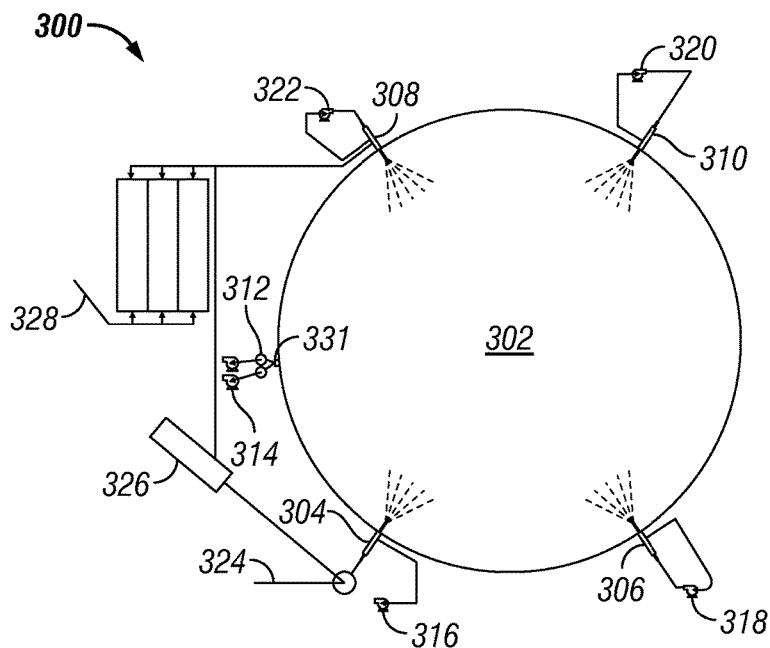
FIG. 3A is a schematic illustration of a system in accordance with embodiments disclosed herein.

FIG. 3A illustrates a system 300 for cleaning paraffinic crude oil tanks in accordance with embodiments disclosed herein. System 300 may include a tank 302, nozzles 304, 306, 308, 310, draw port 312, pumps 314, 316, 318, 320, 322, heat exchanger 324, portable steam boiler 326, frac tanks 328, filter unit 331, hot taps (not shown), and conduits, such as hoses and pipes (not shown).

The nozzles 304, 306, 308, 310 may be inserted beyond a gate valve and collar space that may exist on a manway, either outside, or inside the shell of tank 302. It is to be understood that any suitable number of nozzles may be used. The nozzles may be placed inside of a tank dyke wall of tank 302 for connection to tank 302, and may be fully submerged within the contents of tank 302. Areas for nozzle installation may be stable and as level as possible with sufficient area for the nozzles to be bolted to a hot tap. The nozzles 304, 306, 308, 310 may fluidly connect to pumps 316, 318, 320, and 322, respectively, via hoses and hot taps.

The nozzles may be capable of about 2800 gpm to about 3200 gpm flow rates on a single point fluid draw point. The nozzles may be directionally controllable, injectable through a valve system, and capable of withstanding operational pressures for extended time periods. Tank size and sludge density may define the amount of nozzles needed. In order to provide flexibility, at least four nozzles may be used. A nozzle assembly may include nozzles and directional gears.

Draw port 312 may be located on tank 302 and allows the contents within tank 302 to be drawn out via pump 314. A conduit, such as a hose, may fluidly connect pump 314 to the draw port 312. Filter unit 331 may fluidly connect draw port 312 to pump 314 to prevent pump blockage from trash and other undesired particulates. The filter unit 331 may be fitted to the particle sizing on the pumps 314, 316, 318, 320, 322, and nozzles 304, 306, 308, 310, and may be able to maintain the flow rates of the pumps 316, 318, 320, 322. The filter may be sufficiently sized at levels in excess of the anticipated flow rates, about 3200 gpm or greater, and may include strainer baskets that may collect major debris without unduly delaying a project from excessive cleaning (due to fine filtration). A typical strainer basket for this operation may have approximately 25 mm perforations, although smaller or larger perforations may be desired on differing applications.

Pumps 314, 316, 318, 320, and 322 may be dedicated self-priming, high volume, high pressure, centrifugal pumps. Any other suitable type of pump may be used. The pumps may be sized appropriately in order to achieve a desired volume movement to create circulation within the tank. The flow rates may range from about 2800 gpm to about 3200 gpm, with adjustable operating pressure ranges from about 120 psi to about 145 psi, and the pumps may be capable of continuous operations. A self-priming pump or vacuum assist style pump may pull fluid without the necessity for a flooded suction. The vacuum assist may help movements of high viscosity liquids. The inclusion of a vacuum assist pump may also prevent some issues that may arise in cavitation scenarios.

The types of hoses utilized may be black nitrile high tensile helix wire reinforced neoprene covered petroleum tank hoses ("Dock hoses") rated at around 250 psi working pressures. Any other suitable type of hose may be used.

The system may access a heat source. The heat and temperature desired may be largely determined through chemical evaluation and analytical data pertaining to the melting point of the material components to be processed, more specifically the paraffinic materials. Heating coils within the tank may be used to achieve a desired temperature. Heating coils may utilize the refinery plant steam to raise the temperature of the tank.

The system may access steam. If steam is not available, an appropriately sized boiler and heat exchanger may be utilized. The presence of operable internal heating coils may negate the boiler and heat exchanger utilization if adequate steam is available to meet temperature requirements determined in a sample testing protocol.

Heat exchangers may be substituted for heating coils. A fixed, external, or temporary heat exchanger may be used with plant steam. The heat exchanger may be appropriately sized to reach a desired temperature efficiently. More than one heat exchanger may be utilized.

When plant steam is not available, a portable steam boiler 326 may be utilized and may fluidly connect to the heat exchanger 324. More than one portable steam boiler may be utilized.

Figure 3B:
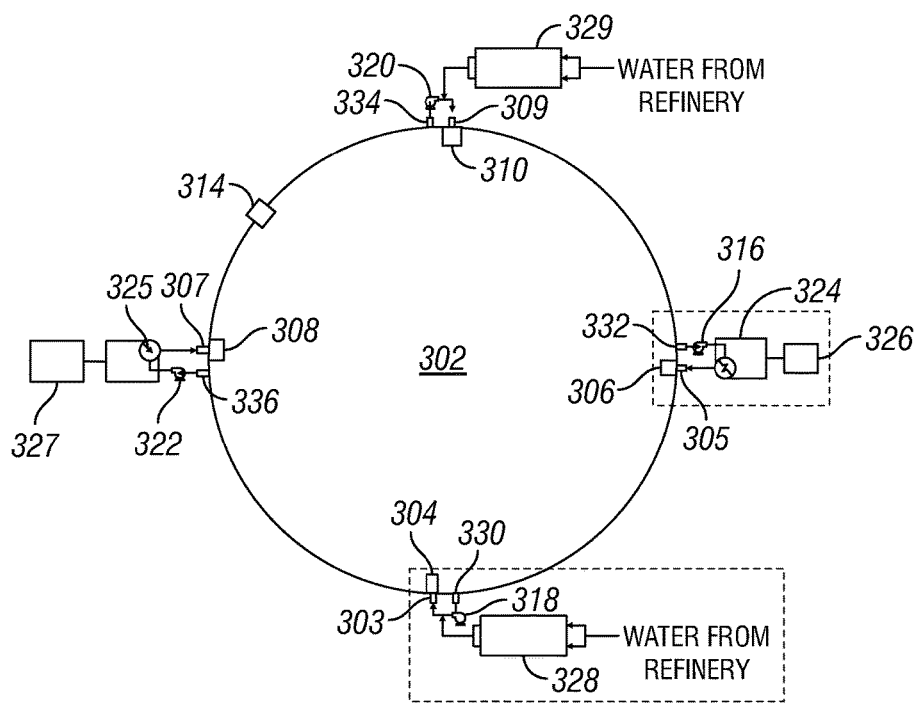
FIG. 3B is a schematic illustration of a system in accordance with embodiments disclosed herein.

FIG. 3B illustrates circulation of the sludge with multiple heat exchangers, and with water and paraffinic hydrocarbon isolation composition. Portable steam boilers 326 and 327 may fluidly connect to the heat exchangers 324 and 325, respectively. The heat exchangers 324 and 325 may fluidly connect to the hot taps 305, 332, and 307, 336, respectively, via conduits. Hot taps 303, 305, 307, and 309 may fluidly connect to the nozzles 304, 306, 308, and 310, respectively. Proper sizing of the heat exchanger and portable steam boiler may be suitable to reach a desired temperature dictated by the sludge to be processed. The pumps may fluidly connect at least two hot taps for circulation of the sludge from tank 302. For example, pump 316 may fluidly connect hot taps 305, 332. Pump 318 may fluidly connect hot taps 303, 330. Pump 320 may fluidly connect hot taps 309, 334. Pump 322 may fluidly connect hot taps 307, 336.

Portable tanks, such as frac tanks 328 and 329, may be used to introduce paraffinic hydrocarbon isolation composition into tank 302 via hoses during a circulation phase. Frac tanks 328 and 329 may fluidly connect to pumps 318 and 320.

A method for cleaning paraffinic crude oil tanks using the system 300 may include manually inserting nozzles 304, 306, 308, 310 beyond a gate valve and collar space that may exist on a manway, either outside, or inside the shell of tank 302. After inserting the nozzles 304, 306, 308, 310, the nozzles may be bolted to hot taps 303, 305, 307, and 309, respectively. Portable steam boilers 326 and 327 may boil fluid and provide steam via a conduit to heat exchangers 324 and 325.

Then, frac tanks 328 and 329 may provide cutter stock through pumps 318 and 320 into tank 302 via hot taps 303 and 309 and nozzles 304 and 310. Pumps 316 and 322 may circulate the entire contents from tank 302 through heat exchangers 324 and 325, and then back into tank 302 via hot taps 307, 336 and 305, 332, and nozzles 308, 306, respectively. The contents may reach a pre-determined temperature, and may homogenize during the circulation. Once temperature is achieved, a minimum of ten (10) tank volume circulations may be required to ensure proper chemical distribution.

Alternatively, heating coils within tank 302 may replace the portable steam boilers 326 and 327, and heat exchangers 324 and 325. The heating coils may heat the contents of tank 302 to a pre-determined temperature. If heating coils are utilized, the contents may circulate without the utilization of the portable steam boilers 326, 327 and heat exchangers 324, 325.

After the introduction of cutter stock, frac tanks 328, 329 may provide water and paraffinic hydrocarbon isolation composition to tank 302 via pumps 318, 320 and nozzles 304, 310, respectively. Throughout the circulation process, periodic, but regular, field testing/sampling may confirm homogenization and chemical contact. Some samples can be pulled and set aside to view for phase breaks. The circulations may be calculated by comparing the volume present in the tank against the flow rate from the pump efficiency curve at the given operating pressure. Example calculations are shown below under "Examples." The circulation phase may allow the paraffinic hydrocarbon isolation composition, water, cutter stock, solids, and oil to blend effectively.

Sample testing may include a basic sediment and water test ("BS&W"). In embodiments, the optimization process with FIG. 2 is used. A BS&W test may utilize a small tabletop centrifuge to calculate the levels of oil, water, and solids in the representative sample acquired from tank 302. An example of calculating the potential effectiveness of the systems and methods disclosed herein is described in the "Examples" section of this disclosure.

If sampling shows that the contents of tank 302 settle into three separate phases: oil, water effluent, and inorganic solid, the pumps 316, 318, 320, 322 may be turned off and circulation ceases. At this point, the settling phase may begin for the contents of tank 302. Also, after a settling phase of the solids and liquids, tankage may be used to remove the remaining water and clarified oil in order to achieve a clean draw without an unnecessary mixing of oil and water.

After the contents have settled into 3 phases, the Pump-off Phase may begin: the uppermost oil layer may be recovered via pump 314 into a recovery tank via a hose, followed by the water layer, leaving the remaining water wet solids layer for further removal or processing. It may be desired to draw down the water layer first, until clarified oil is reached, before removing the top oil layer. Occasionally, it may be desired to add water after the settling phase to raise the level of oil to the appropriate draw point.

In an embodiment, samples are taken from tank 302 before and/or during the four phases. The optimization process is carried out on the sample to determine the proper composition of the paraffinic hydrocarbon isolation composition to use in the four phases.

To further illustrate various illustrative embodiments of the present invention, the following examples are provided.

EXAMPLES

The circulations are calculated by comparing the volume present in the tank against the flow rate from the pump efficiency curve at the given operating pressure. For example, given a 200 foot diameter tank with a volume of 10 feet, and 4 nozzles operating at 3000 gpm, the calculations may look as follows:

Calculate Volume in Barrels

Volume in Barrels (42 US Gal)=(Diameter2/7.14)× Depth of Liquid ([200'×200']/7.14)×10'=56.022 bbls.

To achieve 10 circulations (or 560.220 bbls) the following calculations are used:

Convert Pump Rates from GPM to BBLs Per Hour (3000 gpm×60 min)/42 gal per bbl=4.285 bbls per hour 4,285 bbls per hour×4 pumps=17,140 bbls per hour.

Calculate Circulation Time 56,020 bbls×10 circulations=560,220 bbls 560,220 bbls/17,140 bbls per hour=32.68 hours.

This circulation time may be given a conservative allocation against the theoretical minimum. For this scenario the anticipated non-stop circulation time would be 36 hours at temperature. Once proper circulation is achieved, and the desired tank volume turns are reached, it is time to begin the settling phase of the project.

Two primary tests may be used to determine the potential effectiveness of the system against a field gathered sample. The first test is for proving three phase separation viability, and the second test is for determining an optimized application level.

Phase 1: Sample Homogenization & Phase Separation (Base Case)

1) Measure out the oil/sludge sample along with diesel and tap water into a 400 ml beaker in a 4:2:1 ratio respectively. Suggested amounts are 100 ml oil, 50 ml diesel, and 25 ml water.

Note: Difficult samples may require extra cutter stock. Samples with excessive water may not require any added water.

2) Pipet in a dose of K15 equivalent to 1500 ppm of the total solution volume. Calculate the dosage amount as follows: ml K15 to add={ml oil+ml diesel+ml water}×1500/1000000.

Note: Highly paraffinic samples or samples difficult to dewater may require higher doses up to 3000 ppm.

3) Add a magnetic stir bar and place the beaker on a stirring hot plate with enough stirring to cause a vortex to appear. Set temperature to achieve a reading of 140 F as verified by a thermocouple.

Note: Temperature may be limited to the flash point of the cutter stock being used.

4) Stir and heat at temperature for at least 1 hour.

5) Remove beaker from hot plate and let cool without agitation until a layer of water is seen to breakout. Once the phases have separated, the effectiveness of the treatment may be gauged in Phase 2 below.

Phase 2: Assessment of Recovered Oil Quality by BS&W Test

1) Add an amount of toluene between 35-50 ml to a BS&W centrifuge tube.

2) Carefully draw off an amount of the recovered oil that is equal to the amount of toluene in step 1 and transfer it to the centrifuge tube. Mix the contents well.

3) Place the centrifuge tube in the centrifuge and counterbalance with another tube filled with liquid. Centrifuge for at least 15 minutes at an rpm of at least 1250.

4) Remove the centrifuge tube & determine the volume of sediment/water at the bottom of the tube.

5) Determine the BS&W according to:

BS&W (%)={mls water+sediment at bottom/mls of recovered oil}×100

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A system comprising:
   a paraffinic hydrocarbon isolation composition wherein the paraffinic hydrocarbon isolation composition comprises a mixture of a combination demulsifier and crystal modifier, a surfactant, and a solvent, wherein the surfactant comprises two or more surfactants, wherein one surfactant is a zwitterionic surfactant, wherein the zwitterionic surfactant is cocoamidopropyl betaine, wherein the other surfactant is a nonionic surfactant, wherein the nonionic surfactant is polyethylene glycol;
   a first tank configured to provide the paraffinic hydrocarbon isolation composition to a second tank, wherein the first tank is a frac tank;
   at least four nozzles connected to at least one pump, wherein the paraffinic hydrocarbon isolation composition is pumped out through the at least four nozzles and is circulated back into the second tank; and
   a heat source, wherein the heat source heats the paraffinic hydrocarbon isolation composition before it is pumped back into the second tank.

2. The system of claim 1, wherein the heat source comprises a heat exchanger.

3. The system of claim 1, wherein the heat source comprises a portable steam boiler.

4. The system of claim 1, wherein the at least four nozzles are configured to flow at a rate of about 2800 gpm to about 3200 gpm.

5. The system of claim 1, wherein the at least four nozzles are directionally controllable.

6. The system of claim 1 further comprising at least one centrifugal pump.

7. The system of claim 1, wherein the second tank comprises at least one hot tap.

8. The system of claim 1, wherein the at least four nozzles are configured to flow at a pressure of about 120 psi to about 145 psi.

9. The system of claim 1 further comprising a filter unit.

* * * * *